Jan. 12, 1960     J. A. VACVAL     2,920,615

CULINARY DEVICE

Filed June 18, 1957

INVENTOR.
JOHN A. VACVAL
BY
ATTORNEY

United States Patent Office 2,920,615
Patented Jan. 12, 1960

2,920,615

CULINARY DEVICE

John A. Vacval, Chicago, Ill., assignor to General Electric Company, a corporation of New York Application June 18, 1957, Serial No. 666,386

1 Claim. (Cl. 126—275)

This invention relates to culinary apparatus, and more particularly, it relates to a culinary device for thawing frozen food.

In recent years, there has been a marked trend toward the consumption of greater and greater quantities of frozen food. Today, a considerable portion of the food consumed by the general population is purchased in the frozen state and stored in a freezer until required for use. It is then removed from the freezer and, in most cases, thawed by exposure to air at room temperature or by a lukewarm bath. A warm water bath will accelerate thawing, but here there is a danger the food tissues will become damaged and the food unpalatable. The lukewarm water method is quicker than room air exposure thawing but both methods are too time consuming, particularly where larger and denser masses of frozen food is involved, as with meat packages. Consequently, the relatively long time consumed by food thawing operations presents a problem. The problem is particularly acute where the housewife is away from the home until just before meal time, because of work or club activities or for other reasons. If frozen food is to be prepared for the meal, of necessity, there is delay until the food thawing has progressed to the point where the food can be cooked. In such cases, the delay caused by the food thawing operation may well postpone the meal hour to an inconvenient time. There is therefore a definite need to be fulfilled by the provision of improved facilities for thawing frozen food. My invention relates to a culinary device which answers this need by providing a quick, convenient means for thawing frozen food.

Accordingly, it is an object of my invention to provide a device which will constitute a relatively fast and convenient means for thawing frozen food.

It is another object of my invention to provide a food thawing device for use in conjunction with a heat source such as an electric range surface unit or a gas range burner.

It is still another object of my invention to provide a culinary device which can be used on a range electric or gas surface heating unit for thawing frozen food or for simple baking operations.

Briefly stated, in accordance with the illustrated embodiment of my invention, I have provided a food thawing and heating device adapted for operation in conjunction with a range electric or gas surface heating unit. The device is heated by circulating warm gaseous matter through it such as air heated by an electric surface unit or products of combustion from a gas unit. It will be understood, therefore, that "warm gaseous matter" may appropriately be substituted wherever "air" appears in the specification and claim. The device includes a base having air inlet openings and provided with legs for mounting on a range cooking top or hot plate. On the base rests a rack support baffle with an air inlet passage containing a rack to sustain the food to be thawed or heated. On the base also rests a downwardly open cover. The cover has air outlet openings and is provided with a handle to facilitate its removal when placing food in the thawer or removing food from it. Attached to the cover, and depending from it is an inner liner which is located directly above the rack support baffle when the cover is in place. The inner liner is provided with air inlet and outlet openings. The rack support baffle and the inner liner together form a chamber to enclose the food during the thawing operation. The device also includes air ducts providing communication between the air outlet openings of the inner liner and the air outlet openings of the cover. When the cover is in place, the rack support baffle and the inner liner cooperate with the cover to provide air passages directing an air circulation through the device. In operation, the food thawer would be placed over a range heating unit and the cover would be removed. The frozen food package would be placed inside the device, the cover would be replaced, and the heating unit would be turned on. Heated air would then enter the base openings and circulate through the device, around the frozen food and out of the device by thermosiphonic action. In a relatively short period of time the circulation of the heated air thaws the frozen food to a point where it is ready for cooking. The culinary device of my invention also provides a convenient utensil for the baking of pies and potatoes and other appropriate cooking operations which can be carried out on a range cooking top.

For a better understanding of the invention, reference may be had to the accompanying drawing in which:

Fig. 1 is a vertical cross sectional view of the culinary device embodying my invention taken approximately along the line 1—1 of Fig. 3. Fig. 1 shows the device in a typical setting mounted on a range cooking top over a surface heating unit. The surface heating unit, control knob, and cooking top details are included to better illustrate the setting. Part of the cooking top is broken away for clarity.

Figure 1:
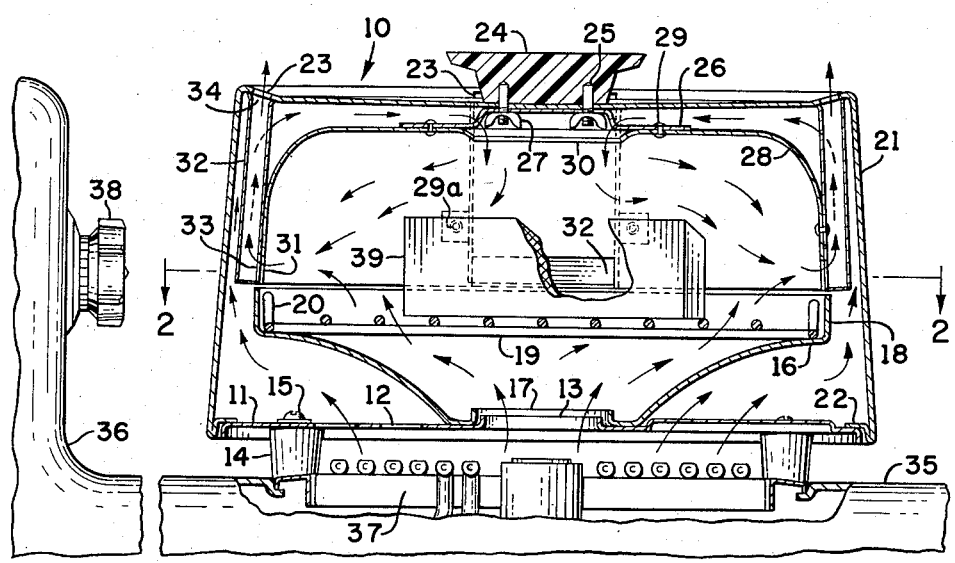
Figure 2:
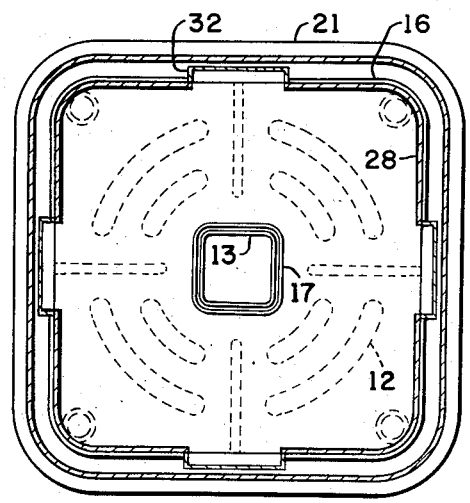
Fig. 2 is a horizontal section of the culinary device taken approximately along the line 2—2 of Fig. 1 with the rack removed.
Figure 3:
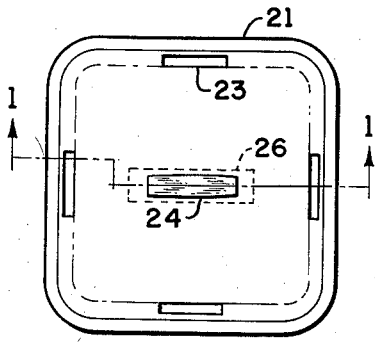
Fig. 3 is a plan view of the cover of the culinary device.

Referring to the drawing for a detailed description of a presently preferred form of my invention, the culinary device 10 includes a flat sheet-metal horizontal base 11. It may be made of aluminum or aluminum-clad steel or any other suitable material, but I prefer to use aluminum. Base 11 may be provided with any suitable number of air inlet openings 12 and is preferably provided with a flanged central air opening 13. The base 11 may also be provided with a flange and suitably embossed to add stiffness to its structure. In my preferred embodiment, four legs 14 are secured to the base 11 by means of screws 15. The legs 14 elevate the base 11 above any work surface on which it may be placed and permit air circulation underneath the base. The legs 14 may be of any suitable material, but I prefer to use high-temperature "Bakelite" plastic.

A rack support baffle 16 rests upon base 11. The baffle 16 in my preferred embodiment is formed from light-gauge aluminum and has a shape approximating that of a shallow square funnel. It has a central air passage 17 which is in direct communication with the central air opening 13 in base 11. The baffle widens out from a relatively narrow flanged base to an upturned flange 18. Registration between the base 11 and the baffle 16 is attained by the cooperation between the flange on opening 13 and the base flange of baffle 16. The flaring shape of the baffle facilitates air circulation above and below it. The flange 18 also functions to direct air circulation in addition to stiffening the baffle. The flange 18, in addition, serves to locate the rack discussed in greater detail hereinafter.

A grid-like rack 19, provided with legs 20, is sustained by rack support baffle 16. The rack 19 functions to support food articles being heated in culinary device 10. The rack 19, in my preferred embodiment is formed from steel wire which provides a strong, open structure, adequate to support the weight of food articles placed upon it. The grid-like open structure of rack 19 facilitates air circulation. The rack 19 is normally used with the legs 20 in a "down" position. However, the rack can be turned over so that the legs 20 are in an "up" position as in Fig. 1. The "up" position drops the level of rack 19 by the length of the legs 20. This alternate position provides more clearance in the food chamber where it is necessary for larger food packages.

A downwardly open cover 21 rests upon base 11. In my preferred embodiment cover 21 has a shape closely approximating that of a truncated pyramid having a square base. When cover 21 is in place on base 11, the two parts cooperate to form an enclosed compartment. Cover 21 may be fabricated from any suitable material, but I prefer to use aluminum. In my preferred embodiment, I provide an inturned flange 22 which extends completely around the lower periphery of cover 21. Flange 22 supports the weight of cover 21 and its attached parts when the cover 21 is mounted on base 11. Flange 22 also adds stiffness to the lower periphery of cover 21. Cover 21 is provided with four rectangular air outlet holes 23 in its horizontal top wall. The holes 23 are located close to the edge of the cover 21 with one disposed on each of the four sides of the square pyramid formed by cover 21 in an approximate central location. Cover 21 is also provided with a handle 24 for replacement and removal of the cover. Any suitable material may be used for the handle, but I prefer to use a high temperature "Bakelite" plastic. Mounted in handle 24 are studs 25 on which a cross-brace 26 is assembled. When wing nuts 27 are threaded on to the studs and tightened against the cross-brace, it is secured to cover 21. Depending from cross-brace 26 is a downwardly open aluminum inner liner 28 secured by rivets 29. Liner 28 has the same general shape as cover 21 and it is centrally disposed within the cover. Also, the lower perimeter of liner 28 substantially coincides with the upper perimeter of baffle 16 in area and shape. As liner 28 is smaller than cover 21, we have a space between the cover and the liner completely around the inner periphery of the cover. Liner 28 is provided with a central top opening 30 and a rectangular gap 31 in the lower periphery of each of its four sides. Secured to liner 28 by rivets 29a are four aluminum, rectangular cross-section chimney-like air ducts 32. Air ducts 32 are closed on the bottom and on all four sides except for a small rectangular aperture 33 on the inner side at the lower end. Ducts 32 also have top openings 34. When the air ducts 32 are assembled in the liner 28, apertures 33 of air ducts 32 exactly coincide with gaps 31 in liner 28 providing air communication between the space under the liner and air ducts 32. Also, top openings 34 in air ducts 31 exactly coincide with air outlet holes 23 in cover 21. Thus, air ducts 32 provide air passages between the space under the liner and the atmosphere. When liner 28 is assembled to cover 21 and cover 21 is mounted on base 11, the upper edge of baffle 16 closely approaches the lower edge of liner 28, thus, liner 28 and baffle 16 cooperate to form an almost wholly enclosed inner chamber.

The operation of culinary device 10 as a food thawer will best be understood from the following description of a typical use. The device 10, after removal from a convenient storage place such as, for example, a range drawer, is placed upon a cooking top 35, part of range 36, directly above a surface cooking unit 37 regulated by control knob 38. While I have illustrated a preferred embodiment of my invention being heated by an electric heating unit of the sheathed resistance conductor type, it will be understood that my invention will work equally well with any domestic heat source, such as, for example, a gas burner unit. It will be understood that if a gas burner unit is used, the warm gaseous matter circulated through the culinary device will be products of combustion rather than heated air as indicated hereinbefore.

Cover 21 is lifted by handle 24, and the frozen food package 39 is then placed upon rack 19. When the cover 21 is replaced, heat can be applied for the thawing operation. After surface unit 37 has been energized at a convenient heat level by control knob 38, a circulation of warm gaseous matter, consisting of air in the illustrated embodiment, will begin throughout culinary device 10. The greater part of the air heated by unit 37 rises so as to pass through air inlet openings 12 in base 11. As this air passage does not have direct access to the atmosphere, the air must flow through the space between the inner chamber and cover 21. After reaching the top of the cover on its interior, the warm air will flow into the inner chamber through central top opening 30 in inner liner 28. The warm air then flows past frozen food package 39 out to the atmosphere through gaps 31 and air ducts 32. This air flow is shown by the arrows in Fig. 1.

Some of the air heated by unit 37 will follow a different path than that described above. This last named air will rise so as to pass through central air opening 13 in base 11, through central air passage 17 of baffle 16, into contact with frozen food package 39 and then out to the atmosphere through air ducts 32. This latter air flow pattern is also shown by the arrows in Fig. 1. The air circulation described constitutes a thermosiphonic system in which warm gaseous matter circulates so that it will rise and follow a passage or flue to the room atmosphere. As the warm air flows through culinary device 10, it loses its heat to the baffle, the liner, and the cover and to the frozen food within the inner chamber. The continuous warm air flow through the thawing device 10 also heats the inner chamber so that the thawing food is enclosed on all sides by a warm radiating surface which aids the thawing operation. Rack 19 is warmed by the air circulation and by contact with baffle 16. As the frozen food rests on rack 19, the frozen food package 39 will absorb some heat by conduction from rack 19. As outlined above, my preferred embodiment comprises a device in which frozen food can be quickly and conveniently thawed out by convection, radiation, and conduction heat transfer from a domestic heat source.

Although culinary device 10 is primarily a food thawing apparatus, its efficient heat transfer characteristics also provide an effective surface heating unit baking and warming device. It can be used successfully for baking foods such as pies, biscuits, and potatoes, and for warming and reconstituting left-over food portions.

While I have shown my invention in but one form, it will be obvious to those skilled in the art that it is not so limited, but is susceptible of various other changes and modifications without departing from the spirit thereof, and I desire, therefore that only such limitations shall be placed thereupon as are imposed by the prior art or as are specifically set forth in the appended claim.

I claim:

A portable food heating device adapted for placement on the cooking top of a cooking range having a heating unit normally used for surface cooking, said device comprising a substantially flat base member having a central opening and a plurality of other openings laterally spaced therefrom, said central opening being of small area relative to said base member; means for supporting said base member above a heating unit with the said central and laterally spaced openings directly thereover to admit heated gas rising from said heating unit; a baffle member comprising a funnel-like structure having imperforate wall means defining an opening of substantially the same size as said base member central opening, said wall means providing for the positioning of said baffle member on said base member with the base member central opening and the baffle member opening in coaxial registration and the wall of said baffle member extending upwardly and outwardly in overlying relation to the said other base member openings; a grid-like food-supporting rack carried by said baffle member at the portion thereof remote from the baffle member opening; a cover structure comprising a transverse top wall and a continuous imperforate side wall depending therefrom, said side wall terminating in a flange portion for removable interfitting association with said base member about the periphery thereof, said transverse wall having openings disposed quadrantally thereabout adjacent the juncture of said transverse and side walls; a bell-like inner liner secured internally of said cover in spaced relation to the transverse and side walls thereof and extending into close proximity to said baffle member about said food-supporting grid to define, with said baffle member, a food-heating chamber wholly enclosed by said cover member and base member; inlet means centrally disposed at the top of said liner; outlet openings at the base of said liner, said outlet openings being equal in number and in similar disposition to said cover openings; and wall means secured to the external wall of said liner to provide enclosed air ducts communicating directly between said liner outlet openings and said cover outlet openings; whereby heated gas rising from said heating unit enters the heating chamber directly through the registering central base opening and said baffle opening and heated gas passes through said other base openings to flow between the liner and the cover to give up heat to the walls thereof, whereby the gas entering said heating chamber by downward flow through said liner opening is relatively cooler than the gas entering said heating chamber directly, thus enforcing a commingling of the respective gas flows and a permeation of the heating chamber thereby, the said commingled gases thereupon flowing from said heating chamber through said ducts for escape to the atmosphere.

References Cited in the file of this patent

UNITED STATES PATENTS

| 337,757 | Ford | May 9, 1886 |
| 594,993 | Harry | Dec. 7, 1897 |
| 1,438,792 | Snyder | Dec. 12, 1922 |
| 1,611,087 | Sussman | Dec. 14, 1926 |
| 1,711,631 | Burnett | May 7, 1929 |
| 1,725,521 | Keiner | Aug. 20, 1929 |

FOREIGN PATENTS

| 860,056 | France | Sept. 20, 1940 |
| 175,610 | Great Britain | Sept. 28, 1922 |
| 604,497 | Great Britain | July 5, 1948 |
| 248,020 | Italy | Mar. 27, 1926 |
| 122,842 | Sweden | Sept. 28, 1948 |